United States Patent [19]

Cavicchio

[11] 4,317,575

[45] Mar. 2, 1982

[54] HIGH TEMPERATURE GASKET

[75] Inventor: Ernest A. Cavicchio, Erie, Pa.

[73] Assignee: GAF Corporation, New York, N.Y.

[21] Appl. No.: 160,145

[22] Filed: Jun. 16, 1980

[51] Int. Cl.³ .............................. F16J 15/10; C08L 1/00
[52] U.S. Cl. .............................. 277/227; 277/DIG. 6; 524/7; 524/8; 524/2; 524/35
[58] Field of Search ......... 277/227, DIG. 6, 228–232; 260/17 R, 42, 42.43

[56] References Cited

U.S. PATENT DOCUMENTS

| | | | |
|---|---|---|---|
| 1,379,590 | 5/1921 | Clapp | 277/DIG. 6 |
| 2,381,248 | 8/1945 | Bascom | 277/DIG. 6 |
| 3,217,832 | 11/1965 | Whitney | 260/42.43 X |
| 3,451,458 | 6/1969 | Stueber | 260/42.43 X |
| 3,767,211 | 10/1973 | Amphlett | 277/227 X |
| 3,971,758 | 7/1976 | Anderson et al. | 260/42 X |
| 4,156,533 | 5/1979 | Close et al. | 277/229 |
| 4,250,064 | 2/1981 | Chandler | 260/42.43 X |

FOREIGN PATENT DOCUMENTS

| | | | |
|---|---|---|---|
| 54-112440 | 3/1979 | Japan | 277/DIG. 6 |
| 363425 | 12/1931 | United Kingdom | 277/227 |

*Primary Examiner*—Robert S. Ward, Jr.
*Attorney, Agent, or Firm*—J. Magee, Jr.; S. H. Parker

[57] ABSTRACT

An asbestos-free gasket is produced from a composition which comprises from about 5% to about 20% of an organic latex binder, from about 5% to about 35% of a cellulosic fibrous material, from about 0% to about 30% of mineral wool, at least about 50% of an inorganic filler, and from about 0 to about 5% of a coloring additive. The percentages being on a dry weight basis of the gasket. The organic materials are present in an amount no greater than 40% of the total dry weight of the gasket and preferably no greater than 30%. The inorganic filler is an inactive additive, stable at a temperature greater than 1700° F., such as Portland Cement, diatomaceous earth, silicates, carbonates, barytes and mixtures thereof. Preferably the inorganic filler is a mixture of barytes and talc in a ratio of from about 1 to 0, to 3 to 1.

20 Claims, No Drawings

HIGH TEMPERATURE GASKET

BACKGROUND OF THE INVENTION

1. Field of the Invention

This invention relates to a gasket material and, more particularly, to a non-asbestos formulation for a high temperature gasket.

2. Description of the Prior Art

Numerous types of gasketing material and gaskets are available as described, for example, in Perry, Chemical Engineer's Handbook, 3rd edition, page 342 of FIG. 88 thereof. These very commonly employ asbestos fibers combined in many instances with metallic structures.

It is well-known that, although asbestos fibers are resistant to high temperatures, they are affected by high temperatures with loss of flexibility because of loss of water and any volatile materials that may have been employed with them to facilitate fabrication. In general, all metallic gaskets, i.e., free from asbestos, are required for temperatures exceeding about 600° C. However, metallic gaskets are generally of low resilience and, after formation, are ill-adapted to temperature cycling to elevated temperatures.

Fibrous materials have been incorporated to serve as reinforcing agents in amounts of from 5 to about 60% by weight of dry materials including chyrsotile or amphibole asbestos, alumina-silicate and other vitreous fibers (available under such tradenames as Fiberfrax, Kaowool, chopped E-glass), refractory filaments, e.g. chrystalline alumina whiskers and staple ceramic fibers and, in some cases, fine metallic filaments. It is desirable to avoid the use of asbestos because of the possible health hazard of this material. Metallic filaments are less desirable because of their very different coefficients of thermal expansion.

Binders have been used primarily to facilitate fabrication and are typically of two types. Organic binders are preferably elastomeric materials, usually incorporated as latices and deposited on the fibrous materials. Latices of natural and synthetic rubbers generally are useful and typical organic binders include polychloroprene, acrylonitrile rubbers, chloro-sulfonated polyethylene, polybutenes, phenol-formaldehyde thermosets, and the like.

Inorganic binders typically used include montmorillonite, e.g., bentonite, hectorite, or saponite and kaolinite (ball clay). Expanded vermiculite and synthetic mica microflakes have also been employed.

However, notwithstanding the recognized need for an asbestos-free formulation and the plethora of possible substitute materials, asbestos-free formulations have been found to have one or more defects such as low temperature tolerances due to the burn-out of organic materials, lack of resiliency, low resistance to absorption of fluid such as oil, low tensile strengths and insufficient cohesive strength to permit fabrication.

SUMMARY

It has now been found that an asbestos-free gasket can be produced using fibers and an organic latex binder. The gasket composite comprises the combination of from about 5% to about 20% of an organic latex binder, from about 5% to about 35% of a cellulosic fibrous material, from about 0% to about 30% of mineral wool, at least about 50% of an inorganic filler, and from about 0 to about 5% of a coloring additive, said percentages being on a dry weight basis of the gasket. The organic binder can be styrene-butadiene copolymers, polychloroprene, acrylonitrile-butadiene copolymers, ethylene-propylene-diene copolymers, isobutylene-isoprene copolymers or mixtures thereof. The organic materials are present in an amount no greater than about 40% but preferably no greater than about 30% of the total dry weight of the gasket. The inorganic filler is an inactive additive, stable at a temperature greater than 1700° F., such as Portland Cement, diatomaceous earth, silicates, carbonates, barytes and mixtures thereof. Preferably the inorganic filler is a mixture of barytes and talc in a ratio of from about 1 to 0, to 3 to 1. Other ingredients can include coloring additives in an amount of from about 2 to about 5%, such as red iron pigment, carbon black and zinc oxide.

DESCRIPTION OF THE PREFERRED EMBODIMENTS

The preferred gasket binders include polymers or copolymers of a nitrile-butadiene, nitrile-butadiene-styrene, butadiene-styrene, isobutylene-isoproprene, acrylic acid esters ethylene-propylene-diene and polychloroprene.

The fibers which can be used include fibers made by flowing air or steam through slag and commonly known as mineral wool. Other fibers which can be used are water insoluble, natural or synthetic fibers, or blends of fibers, such as the cellulosic fibers, commonly known as wood pulp, glass fibers, mineral wool, as well as polyethylene, polypropylene, polyester and other polymeric fibers. Bleach and unbleached sulfite and sulfate pulps, reclaimed kraft clippings, as well as other forms of cellulosic fibers can be used.

As recognized in U.S. Pat. No. 4,156,533, gasket compositions include fibrous materials, which are incorporated to serve as reinforcing agents. Among the potential asbestos substitutes is chopped glass fibers.

In order to achieve desired gasket properties, a composition was prepared from 16 grams of ½ inch chopped glass fiber sold under the designation A-10 by the Johns-Manville Company and 4 grams of an acrylonitrile latex sold under the designation Chemigum 3077A by the Goodyear Tire & Rubber Company. One gram of aluminum sulfate had to be added to the latex-glass fiber blend to achieve precipitation onto glass fibers was not achieved and a hand sheet was not formed.

The foregoing procedure was repeated using one quarter inch glass fiber but with no change in results.

The foregoing procedure was repeated using glass powder. The resultant sheet had a 100 p.s.i. tensile strength, a compressibility at 5,000 p.s.i., of 70% and a recovery of 15%. The physical properties were determined to be poor with respect to the requirements for a gasket material.

The last procedure was repeated except that three drops of silane adhesive sold under the designation Z-6040 by the Dow Corning Company were added to the blend. The physical properties were the same as in the previous experiment.

It was thus apparent that asbestos fibers could not simply be replaced by what are generally considered to be equivalent fibers.

Table I compares three formulations using mineral wool as a reinforcing agent for a high temperature gasket. The product in run 1, proved to be inadequate to warrant testing whereas the products from runs 2 and 3 included bleached sulfite pulp and produced high tensile strength products.

TABLE I

| Run | 1 | 2 | 3 |
|---|---|---|---|
| ABS** | 26.90 | 18.20 | 13.87 |
| Mineral Wool | 26.90 | 27.30 | 27.75 |
| Talc | 35.80 | 36.40 | 37.00 |
| Bleached Sulfite | — | 9.10 | 13.87 |
| Zinc Oxide | 2.70 | 2.70 | 1.40 |
| Blancol N | .90 | .40 | .50 |
| Bostex 312 | 3.20 | 2.20 | 1.70 |
| Carbon Black | .80 | .80 | 1.20 |
| Alum | 2.70 | 2.70 | 2.70 |
| Wt./100 ft.$^2$ | * | 14.30 | 14.50 |
| Caliper (inc.) | * | .025 | .025 |
| Density (lbs./ft.$^3$) | * | 68.60 | 69.60 |
| Tensile p.s.i. | * | 1200.00 | 1100.00 |

TABLE I-continued

| Run | 1 | 2 | 3 |
|---|---|---|---|
| % Compression @ 5,000 | * | 31.30 | 30.50 |
| % Recovery | * | 44.00 | 40.00 |
| Fluid Absorption | | | |
| 5 hrs. @ 300° F. in #3 Oil | | | |
| % Thickness Inc. | * | * | * |
| % Compression | * | * | * |
| % Tensile Loss | * | * | * |
| 5 hrs. @ R.T. Fuel B | | | |
| % Weight Inc. | * | * | * |
| % Thickness Inc. | * | * | * |

*Not Tested
**ABS - Acrylonitrile/Butadiene/Styrene - 35/55/10

TABLE II

| Run | 1 | 2 | 3 | 4 | 5 | Control |
|---|---|---|---|---|---|---|
| Asbestos Fiber | | | | | | 83.5 |
| Mineral Wool | | | | | 30.0 | |
| Talc | | | | | 40.0 | |
| Sulfite Pulp | 5.0 | 10.0 | 15.0 | 15.0 | 15.0 | |
| BaSO$_4$ | 80.0 | 75.0 | 70.0 | 70.0 | | |
| ABS* | 15.0 | 15.0 | 15.0 | 15.0 | 15.0 | 15.0 |
| Blancol | | | | | | .5 |
| Zinc Oxide | 1.5 | 1.5 | 1.5 | 1.5 | 1.5 | 1.5 |
| Boxtex | 1.8 | 1.8 | 1.8 | 0.0 | 1.8 | 1.5 |
| Wt./100 ft.$^2$ | 23.5 | 22.5 | 22.0 | 24.0 | 23.0 | 21.0 |
| Caliper (inches) | .026 | .031 | .032 | .033 | .060 | .045 |
| Density (lbs/ft$^3$) | 109.0 | 87.0 | 82.0 | 86.0 | 46.0 | 57.0 |
| Tensile (p.s.i.) | 1270.0 | 1435.0 | 1825.0 | 1650.0 | 790.0 | 1534.0 |
| Compression (%) (at 5,000 p.s.i.) | 29.0 | 29.0 | 36.0 | 38.0 | 53.0 | 43.5 |
| Recovery (%) | 47.0 | 44.0 | 40.0 | 23.0 | 24.0 | 21.0 |
| Ignition Loss (1 hr. at 1500° F.) | 22.0 | 29.0 | 35.0 | 32.0 | 33.7 | 30.0 |
| Fluid Adsorption (5 Hr. in #3 Oil @ 300° F.) | | | | | | |
| % Tensile Loss | 18.0 | 8.0 | 9.0 | 30.0 | 22.0 | 13.0 |
| Compression | 32.0 | 30.0 | 38.0 | 38.0 | 53.0 | 46.0 |
| Weight Increase | 11.0 | 25.0 | 37.0 | 27.0 | 40.0 | 36.0 |
| (5 Hr. @ Room Temp.) Fuel B | | | | | | |
| Weight Increase | 22.0 | 25.0 | 26.0 | 23.0 | 48.0 | 45.0 |
| Thickness | 3.0 | 5.0 | 1.5 | 1.5 | 2.5** | 0.0 |

*ABS = Acrylonitrile/Butadiene/Styrene - 35/55/10
**Sealability Not Acceptable
Ingredients are on a basis of parts by weight of solids.

TABLE III

| | Control | 1 | 2 | 3 | 4 | 5 |
|---|---|---|---|---|---|---|
| Paperbestos #5 | 60.29 | — | — | — | — | — |
| Asbestos JM7M57 | 21.07 | — | — | — | — | — |
| Mineral Wool | — | 27.36 | 27.49 | 27.49 | 27.36 | 27.49 |
| Diatomaceous Earth | — | — | — | 36.65 | 36.48 | 36.65 |
| Kraft Clippings | — | 9.12 | 9.16 | 9.16 | — | — |
| Talc | — | 36.48 | 36.65 | — | — | — |
| Newspaper | — | — | — | — | 9.12 | — |
| Bleached Sulfite Pulp | — | — | — | — | — | 9.16 |
| Chemigum 260 | 15.39 | 18.24 | 18.32 | 18.32 | 18.24 | 18.32 |
| Chemigum 550 | — | — | — | — | — | — |
| Chemigum 61A | — | — | — | — | — | — |
| Hycar 1562 × 158 | — | — | — | — | — | — |
| Chemigum 61C | — | — | — | — | — | — |
| Zinc Oxide | 1.37 | 1.82 | 1.83 | 1.83 | 1.82 | 1.83 |
| Bostex 312 | 1.47 | 2.19 | 2.20 | 2.20 | 2.19 | 2.20 |
| Blancol N | .39 | .91 | .92 | .92 | .91 | .92 |
| Alum | — | 2.28 | 1.83 | 1.83 | 2.28 | 1.83 |
| Carbon Black | — | 1.60 | 1.60 | 1.60 | 1.60 | 1.60 |
| Total % | 99.98 | 100.00 | 100.00 | 100.00 | 100.00 | 100.00 |
| Total Weight (Grams) | 1020.00 | 1096.50 | 1091.50 | 1091.50 | 1096.50 | 1091.50 |
| Weight of 7 × 7 Sample | 21.01 | 29.12 | 20.95 | 22.11 | 21.76 | 22.36 |
| Wt./100 ft.$^2$ | 13.59 | 18.84 | 13.56 | 14.31 | 14.08 | 14.47 |
| Caliper (inch) | .0220 | .032 | .0223 | .0252 | .0248 | .0247 |
| Density (lb./ft.$^3$) | 74.18 | 70.68 | 72.97 | 68.15 | 68.15 | 70.60 |
| Tensile p.s.i. | 1477.00 | 257.00 | 605.00 | 833.00 | 574.00 | 931.00 |
| Compress @ 5,000% | 35.87 | 34.42 | 31.64 | 27.56 | 29.95 | 30.29 |

TABLE III-continued

| | | | | | | |
|---|---|---|---|---|---|---|
| Recovery | 34.83 | 43.95 | 42.70 | 49.91 | 47.85 | 43.98 |
| Fluid Absorption 5 hrs. @ 300 F. in #3 Oil | | | | | | |
| % Thickness Increase | 5.95 | 6.30 | 2.69 | 4.07 | 6.80 | 3.22 |
| % Compressibility | 38.31 | 45.62 | 40.92 | 40.61 | 43.18 | 35.62 |
| % Tensile Loss | 13.87 | 15.17 | 24.13 | 28.57 | 17.59 | 25.02 |
| 5 Hrs. @ R. T. Fuel B | | | | | | |
| % Weight Increase | 12.50 | 26.15 | 17.77 | 33.33 | 22.00 | 18.51 |
| % Thickness Increase | 6.81 | 7.81 | 6.12 | 3.27 | 4.81 | 5.28 |

| | 6 | 7 | 8 | 9 | 10 | 11 |
|---|---|---|---|---|---|---|
| Paperbestos #5 | — | — | — | — | — | — |
| Asbestos JM7M57 | — | — | — | — | — | — |
| Mineral Wool | 26.58 | 26.58 | 26.58 | 26.58 | 26.58 | 26.58 |
| Diatomaceous Earth | — | 35.45 | 35.45 | 35.45 | 35.45 | 35.45 |
| Kraft Clippings | — | — | — | — | — | — |
| Talc | 35.45 | — | — | — | — | — |
| Newspaper | — | — | — | — | — | — |
| Bleached Sulfite Pulp | — | — | — | — | — | — |
| Chemigum 260 | 26.58 | 26.58 | — | — | — | — |
| Chemigum 550 | — | — | 26.58 | — | — | — |
| Chemigum 61A | — | — | — | 26.58 | — | — |
| Hycar 1562 × 158 | — | — | — | — | 26.58 | — |
| Chemigum 61C | — | — | — | — | — | 26.58 |
| Zinc Oxide | 2.66 | 2.66 | 2.66 | 2.66 | 2.66 | 2.66 |
| Bostex 312 | 3.19 | 3.19 | 3.19 | 3.19 | 3.19 | 3.19 |
| Blancol N | 1.33 | 1.33 | 1.33 | 1.33 | 1.33 | 1.33 |
| Alum | 2.66 | 2.66 | 2.66 | 2.66 | 2.66 | 2.66 |
| Carbon Black | 1.55 | 1.55 | 1.55 | 1.55 | 1.55 | 1.55 |
| Total % | 100.00 | 100.00 | 100.00 | 100.00 | 100.00 | 100.00 |
| Total Weight (Grams) | 1128.50 | 1128.50 | 1128.50 | 1128.50 | 1128.50 | 1128.50 |
| Weight of 7×7 Sample | 23.12 | 17.30 | 19.90 | 20.53 | 21.12 | 22.13 |
| Wt./100 ft.$^2$ | 14.96 | 11.19 | 12.88 | 13.28 | 13.67 | 14.32 |
| Caliper (inch) | .0297 | .0303 | .0338 | .0355 | .0342 | .0366 |
| Density (lb./ft.$^3$) | 60.46 | 44.39 | 45.75 | 44.92 | 47.96 | 49.96 |
| Tensile p.s.i. | 732.00 | 618.00 | 443.00 | 316.00 | 190.00 | 232.00 |
| Compress @ 5,000% | 50.58 | 52.02 | 50.39 | 55.96 | 50.37 | 51.32 |
| Recovery | 29.02 | 25.95 | 29.67 | 25.02 | 31.07 | 32.16 |
| Fluid Absorption 5 hrs. @ 300 F. in #3 Oil | | | | | | |
| % Thickness Increase | 2.99 | 2.69 | 2.94 | 1.88 | 2.42 | 1.33 |
| % Compressibility | 63.12 | 54.44 | 61.33 | 65.33 | 72.49 | 70.64 |
| % Tensile Loss | 26.50 | 18.60 | 9.93 | 46.51 | 57.89 | 20.68 |
| 5 Hrs. @ R. T. Fuel B | | | | | | |
| % Weight Increase | 40.81 | 52.77 | 57.14 | 48.97 | 45.83 | 46.15 |
| % Thickness Increase | 5.08 | 3.57 | 4.41 | 2.82 | 3.23 | 3.13 |

TABLE IV

| Run | 1 | 2 |
|---|---|---|
| Bleached Sulfite Pulp | 9.4 | 9.20 |
| 260 | 14.2 | — |
| 550 | — | 13.80 |
| Red Iron Pigment | — | — |
| Carbon Black | 2.8 | 2.70 |
| Talc | 17.70 | 17.30 |
| Barytes | 51.20 | 49.20 |
| ZnO | 1.4 | 1.20 |
| Bostex | 1.6 | 1.40 |
| Zetax | 0.20 | .25 |
| Alum | 1.10 | .90 |
| Caliper (inch) | .045 | * |
| Density Lbs./Ft.$^3$ | 85 | * |
| % Compressibility @ 5000 | 30 | * |
| % Recovery After 5000 | 38 | * |
| Tensile P.S.I. | 1000 | * |
| % Ignition Loss | | |
| 500° F. | 6.2 | * |
| 900° F. | 22 | * |
| 1200° F. | 24 | * |
| 1500° F. | 26 | * |
| Crush Extrusion % Relaxation-Method B 6000 Lbs. or 3000 P.S.I. | | |
| R.T. | 15 | * |
| 212° | 28.5 | * |
| 300° | 43.5 | * |
| 400° | 49 | * |
| ASTM #3 Oil-5 Hr. @ 300° F. | | |
| % Compress | 35 | * |
| % Tensile Loss | 10 | * |
| % Thickness Change | 2 | * |
| ASTM Fuel B - 5 Hr @ R.T. | | |
| % Weight Change | 17.5 | * |
| % Thickness Change | 0 | * |
| Heat Aging 22 Hr. @ 400° F. | | |
| % Weight Change | 7.2 | * |
| % Thickness Change | 0 | * |
| % Compressibility @ 5000 P.S.I. | 22.5 | * |
| % Recovery after 5000 P.S.I. | 25 | * |

*Poor material not tested. Run poorly on paper machine.

The mineral wool must be free of unfiberized material or, as it is commonly known, shot. The presence of shot results in the poor properties is because they produce lumps or hard spots potentially of greater thickness than the gasket. Therefore, they create weak spots and defective regions.

Although the mineral wool systems were found to produce self-supporting sheets having structural integrity, superior results on a subjective and test basis were achieved with the systems which employed barytes or barytes and talc.

As well known in the art of papermaking, high tensile strengths are normally obtained through the use of fibrous materials. Unexpectedly, for reasons which are not readily apparent, extremely high tensile strengths were obtained with low fiber content formulations when used in combination with barytes. The advantage lies in the ability to have a low ignition loss of material at temperatures of 1700° F. or greater due to the predominately inorganic components.

The upper limit for the barytes is 90 parts per 100 parts of the combined total of sulfite pulp, acrylonitrile binder and barytes.

The particle size of the barytes should be in the range in which all passes through a 200 mesh screen and more through a 375 mesh screen. The larger particles tend to settle whereas the thinner particle remains properly dispersed.

Cost reduction, density decrease and high quality results on a subjective, as well as a test basis, where achieved through the use of barytes in combination with an inert filler such as talc. Other fillers which can be used include diatomaceous earth, calcium carbonate and clay. The ratio of barytes to inert filler can range from 1:0 to 3:1. The organic fiber contributes significantly to the ability to produce the gasket on conventional papermaking equipment. However, the organic fibrous material burns out at the temperature of use of the gasket and, consequently, cannot be present in an amount exceeding 40% of the total dry weight of the materials and preferably not greater than 30%. The presence of other organic ingredients, such as acrylonitrile binder, further decreases the maximum permissible content of the organic fibrous ingredient to a combined total content of 40% organic fibrous matter and other organic ingredients such as the binder.

The preferred fillers include talc, diatomaceous earth and cement.

The various properties which are required include an ability to drain the material during the manufacture of the sheet gasket material on papermaking equipment.

A high tensile strength is primarily of interest in the fabrication assembly of the gasket.

In some applications, the gasket is used in combination with silicon sealing materials and, therefore, the gasket must be relatively inert to such sealing materials.

The concentration of organic material is preferably kept low because the elevated temperatures encountered in use has a tendency to burn out the organic components. Thus, a low ignition loss is preferred.

The sulfite component contributes to the high tensile strength and while a high content is preferred, because of its being combustible, its use must be kept at a minimum.

The barium sulfate acts as a filler, aids the drainage ability of composition during formation on papermaking equipment.

Among the critical requirements of the formulation is the need for a high wet tensile strength in the uncured material so as to permit processing of the formulation on paper making equipment. The use of cellulosic fibers, such as the sulfite component of the example, serves to meet this requirement.

It was found that the use of clays above provided inadequate wet tensile strength while use of cellulosic materials above resulted in products having a limited temperature range to which the gasket could be subjected before excessive burn-out occurred.

The control runs employed standard commercial products using asbestos fibers. Specifically, the asbestos fiber employed in Table I, included 55 parts of an asbestos fiber sold under the designation 7MS7 by the Johns-Manville Corporation and 28.5 parts of an asbestos fiber sold under the trademark "Paperbestos #5" by the Johns-Manville Corporation.

A moderately low compressibility is generally preferred, although in certain applications, as for example where the matting surfaces are rough or uneven, a high level of compressibility can be an advantage. The gasket must follow the expansion and contraction which occur due to temperature cycling and, therefore, a high recovery level is essential.

PROCEDURE FOR PREPARING GASKET

A dry sheet of sulfite pulp is mixed in a blender with 1,000 ml. of water for three 30 second mixing cycles. Barytes, zinc oxide, 2,000 ml. of water and the broken sulfite pulp are mixed in a jar for one or two minutes. Dilute latex and Bostex 312 with 250 ml of water, add to mixing jar and mix for one or two minutes. Aluminum sulfate (alum.) is added as a 5% solution until the milky solution turns clear. Carbon black is then added and mixing is carried out for one minute.

The resultant mixture is poured from the mixing jar onto a cheesecloth, blotted to remove excess water and then pressed to remove as much water as possible. Oven drying at 300° F. is carried out for 20 minutes or until dry.

The test procedures are in accordance in ASTM 38-F-104.

GLOSSARY

The Goodyear latices sold under the trademark "Chemigum", are copolymers of acrylonitrile and butadiene and are used primarily for their binding and adhesive qualities. They are noted for their resistance to oil and solvent attack, toughness, high resilience and their ability to be used in either cured or uncured form.

Chemigum 260 is a medium acrylonitrile content, ABS type, small particle size polymer which is polymerized with 10 parts of styrene monomer for imparting good tensile strength. It is basically designed for beater addition to asbestos or cellulose but can be considered for saturation type processes. It is a high Mooney polymer which provides good resiliency for a high degree of compression recovery, fatigue resistance and creep relaxation. Even though Chemigum 260 contains a small level of styrene, it retains a high degree of resistance to attack by fuel, oil and solvents.

Chemigum 550 latex is an anionic, carboxylic modified medium acrylonitrile content latex. Chemigum 550 latex is made with a special emulsifier system which allows it to be precipitated by polyvalent cations in the beater addition process. It is also suited for application by commercial heat sensitization processes used in the manufacture of non-wovens. Chemigum 550 latex is a highly efficient binder that exhibits good abrasion and delamination resistance and high tensile strength when cured with zinc oxide. It is suggested for use in non-wovens and as binder for high strength papers by either saturation or beater addition. Chemigum 550 also finds application as a latex additive where its high level of carboxylation is desirable.

Chemigum 61C is a 45-55 acrylonitrile-butadiene copolymer.

Chemigum 3077A is a former designation for Chemigum 260.

BLANCOL N is a trademark of GAF Corporation for a sodium salt of sulfonated napthalene-formaldehyde condensate and is used as a dispersing agent for pigments, clays and other solids.

Kraft Clippings refers to clippings of a strong and relatively cheap paper made chiefly from pine by digestion with a mixture of caustic soda, sodium sulfate, sodium carbonate and sodium sulfide.

Bostex 312 is a trademark of the Akron Dispersions Company for a mixture of three parts sulfur, three parts of butyl zimate accelerator and four parts Wingstay L.

Wingstay Antioxidant—Trademark of the Goodyear Corporation for a paraphenylenediamine derivative used a an antioxidant for synthetic rubbers.

Mineral Wool refers to fibers made by blowing air or steam through slag.

The barium sulphate is a natural material commonly called barytes. The barytes of the examples is a fine particle size pigment grade material, sold under the trademark #290L0 Micron, by Whittaker, Clark & Daniels Company.

The sulfite pulp is a paper or pulp obtained by digestion of a coniferous wood with magnesium, ammonium or calcium disulfite containing free sulfur dioxide.

Zetax is a trademark of the R. T. Vanderbilt & Co. for a zinc 2-mercaptobenzothiazole and is used as an accelerator in rubber curing.

Talc L is a coarse talc which has a particle size as follows:

0 to 1 percent retained on through a #80 screen,
0 to 2 percent retained on a #100 screen,
0 to 15 percent retained on a #200 screen,
15 to 25 percent retained on a #325 screen, and
65 to 80 percent is collected on the pan.

Hycar 1562×158 is a trademark of the B. F. Goodrich Chemical Company for a 40–60 acrylonitrile-butadiene copolymer.

What is claimed is:

1. A high temperature, asbestos-free gasket comprising:
    a. from about 5% to about 20% of an organic latex binder;
    b. from about 5% to about 35% of cellulosic fibrous material;
    c. from about 0% to about 30% of mineral wool;
    d. at least about 50% of an inorganic filler; and
    e. from about 0 to about 5% of a coloring additive, said percentages being on a dry weight basis of the gasket.

2. The high temperature gasket of claim 1, wherein said organic binder is a member selected from the group consisting of styrene-butadiene copolymers, polychloroprene, acrylonitrile-butadiene copolymers, ethylene-propylene-diene copolymers, isobutylene-isoprene copolymers and mixtures thereof.

3. The high temperature gasket of claim 2, wherein said organic binder is an acrylonitrile-butadiene-styrene copolymer.

4. The high temperature gasket of claim 1, wherein organic materials are present in an amount no greater than 40% of the total dry weight of the gasket.

5. The high temperature of claim 1, wherein organic materials are present in an amount no greater than 30% of the total dry weight of the gasket.

6. The high temperature gasket of claim 1, wherein said inorganic filler is an inactive additive, stable at a temperature greater than 1700° F., selected from the group consisting of talc, diatomaceous earth, silicates, carbonates, barytes and mixtures thereof.

7. The high temperature gasket of claim 1, wherein said inorganic filler comprises barytes and talc in a ratio of from about 1 to 0, to 3 to 1.

8. The high temperature gasket of claim 1, wherein said binder comprises from about 15 to 20% of an acrylonitrile-butadiene-styrene copolymer and curing agents.

9. The high temperature gasket of claim 1, wherein said coloring additives consist of from about 2 to about 5% of a material selected from the group consisting of red iron pigment, carbon black, zinc oxide, and mixtures thereof.

10. The high temperature gasket of claim 1, wherein said inorganic filler comprises Portland Cement.

11. A composition for forming on paper making equipment, a high temperature, asbestos-free gasket comprising:
    (a) from about 5% to about 20% of an organic latex binder;
    (b) from about 5% to about 35% of a cellulosic fibrous material;
    (c) from about 0% to about 30% of mineral wool;
    (d) at least about 50% of an inorganic filler;
    (e) from about 0 to about 3% of an agglomerant; and
    (f) from about 0 to about 5% of a coloring additive said percentages being on a dry weight basis of the gasket.

12. The composition of claim 11, wherein said organic binder is a member selected from the group consisting of styrene-butadiene copolymers, polychloroprene, acrylonitrile-butadiene copolymers, ethylene-propylene-diene copolymers, isobutylene-isoprene copolymers, and mixtures thereof.

13. The composition of claim 12, wherein said organic binder is an acrylonitrile-butadiene-styrene copolymer.

14. The composition of claim 11, wherein organic materials are present in an amount no greater than 40% of the total dry weight of the gasket.

15. The composition of claim 11, wherein organic materials are present in an amount no greater than 30% of the total dry weight of the gasket.

16. The composition of claim 11, wherein said inorganic filler is an inactive additive, stable at a temperature greater than 1700° F., selected from the group consisting of talc, diatomaceous earth, silicates, carbonates, barytes and mixtures thereof.

17. The composition of claim 11, wherein said inorganic filler comprises barytes and talc in a ratio of from about 1 to 0, to 3 and 1.

18. The composition of claim 11, wherein said binder comprises from about 15 to 20% of an acrylonitrile-butadiene-styrene copolymer and curing agents.

19. The composition of claim 11, wherein said coloring additives consist of from about 2 to about 5% of a material selected from the group consisting of red iron pigment, carbon black, zinc oxide, and mixtures thereof.

20. The composition of claim 11, wherein said inorganic filler comprises Portland Cement.

* * * * *